United States Patent [19]

Snyder, Jr. et al.

[11] 4,109,989
[45] Aug. 29, 1978

[54] ENVIRONMENTALLY SEALED ELECTRICAL CONNECTOR

[75] Inventors: Clair Wilson Snyder, Jr., Hellam; Paul Birchard Derr, Middletown, both of Pa.

[73] Assignee: AMP Incorporated, Harrisburg, Pa.

[21] Appl. No.: 585,622

[22] Filed: Jun. 10, 1975

[51] Int. Cl.² .............................................. H01R 13/52
[52] U.S. Cl. ................................... 339/94 M; 339/96; 339/117 R
[58] Field of Search .................... 339/36, 42, 45, 91, 339/94, 96, 103, 117

[56] References Cited

U.S. PATENT DOCUMENTS

| 2,194,769 | 3/1940 | Reed | 339/91 R |
|---|---|---|---|
| 2,409,650 | 10/1946 | Wiggins | 339/91 R |
| 2,858,518 | 10/1958 | Chrystie et al. | 339/96 |
| 3,072,021 | 1/1963 | Marcon | 339/45 M |
| 3,378,811 | 4/1968 | Cullen et al. | 339/96 |
| 3,519,975 | 7/1970 | Prow, Jr. et al. | 339/42 |
| 3,742,426 | 6/1973 | Huber et al. | 339/42 |

FOREIGN PATENT DOCUMENTS

| 1,255,427 | 1/1961 | France | 339/94 M |
|---|---|---|---|
| 1,391,459 | 1/1965 | France | 339/96 |
| 901,187 | 1/1954 | Fed. Rep. of Germany | 339/36 |
| 1,202,374 | 10/1965 | Fed. Rep. of Germany | 339/42 |
| 274,176 | 6/1970 | U.S.S.R. | 339/96 |

*Primary Examiner*—Joseph H. McGlynn
*Attorney, Agent, or Firm*—Russell J. Egan

[57] ABSTRACT

A sealed electrical connector is disclosed in which both the plug and receptacle portions are completely sealed from the normal atmospheric environment in both the connected and disconnected conditions. Each of the plug and receptacle members is provided with a normally closed sealing diaphragm extending across the mating ends thereof to protect the contacts enclosed thereby from moisture, dirt, etc. The diaphragms are opened, when the connectors are mated, by the male pin contact which extends through both sealing diaphragms to engage in the female receptacle contact. The subject connector obviates the need for a cover, which must be removed prior to mating the plug into the receptacle, and thus mating of the plug into the receptacle can be accomplished using one hand only.

28 Claims, 7 Drawing Figures

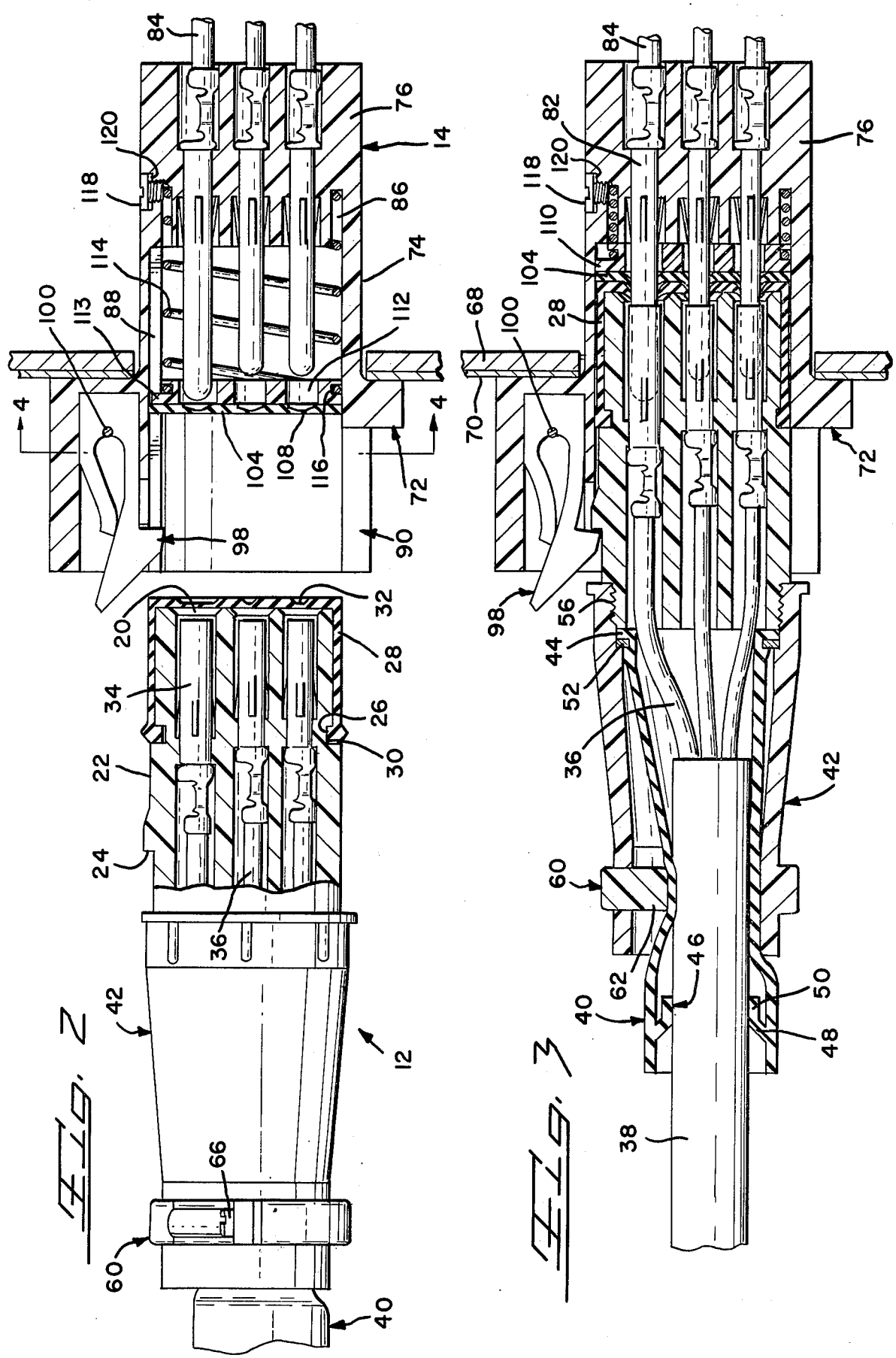

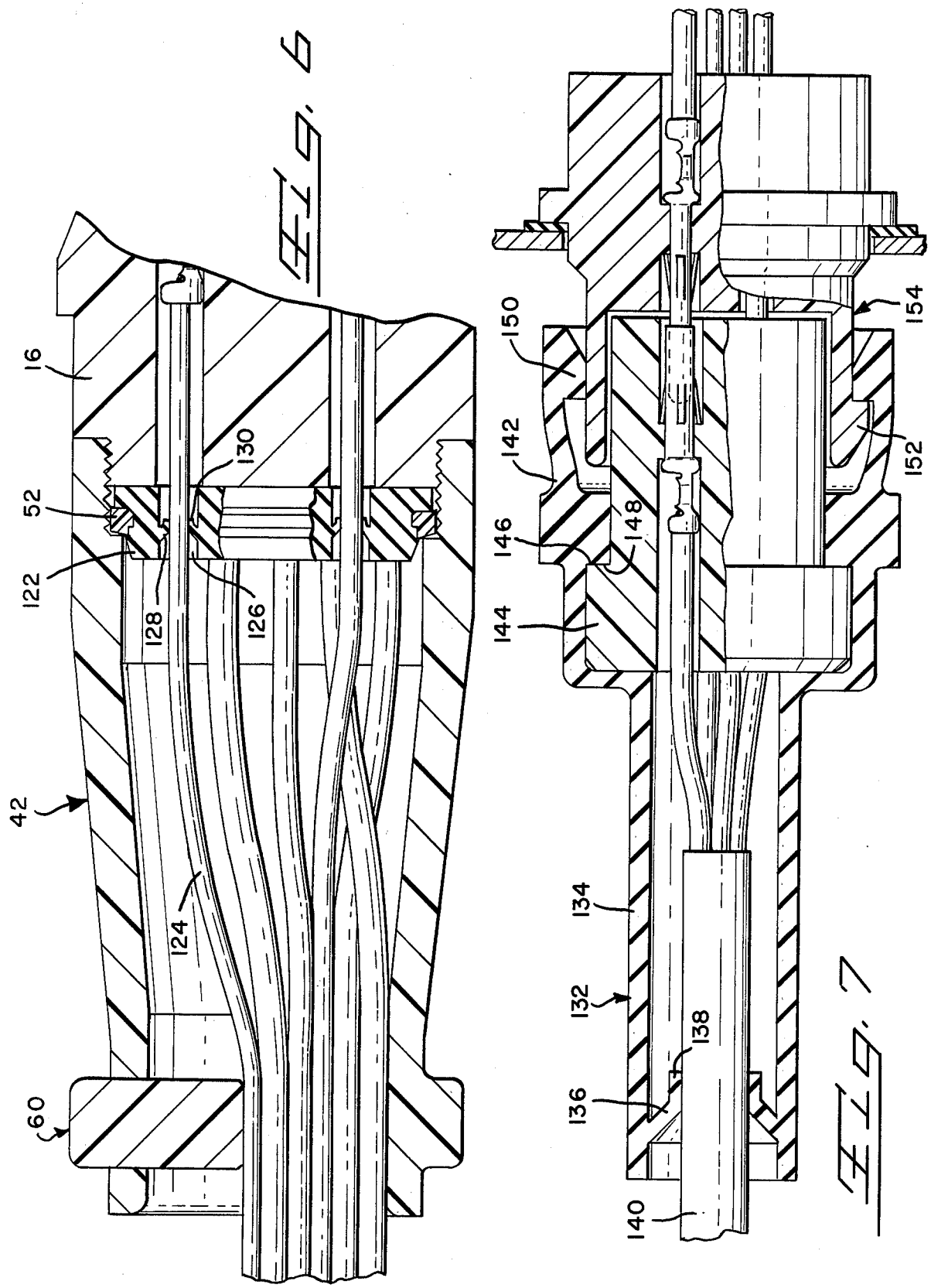

ENVIRONMENTALLY SEALED ELECTRICAL CONNECTOR

BACKGROUND OF THE INVENTION

1. Field of the Invention

The present invention relates to an electrical connector which is sealed against the normal atmospheric environment and in particular to an electrical connector in which both the plug and receptacle portions are sealed in both the mated and unmated conditions.

2. The Prior Art

Most electrical connectors have been designed to provide a tight seal against the normal atmospheric environment only when the connector members are mated. Some connectos have a cover or lid which tightly fits over the receptacle portion making it sealed tight in an unmated condition. However, very few electrical connectors provide sealing of the contacts for both the plug and the receptacle members when they are not mated. Even fewer electrical connectors provide sealing for both the plug and the receptacle in the mated and unmated condition and yet can be mated with one hand. Those known connectors that have sealing for both the plug and receptacle generally have some kind of cover or lid which must be removed from at least one or both of the members before they can be properly fully mated.

SUMMARY OF THE INVENTION

The present invention achieves sealing of both the plug and receptacle portions of a connector in both the mated and unmated conditions by having a sealing diaphragm extending across the mating faces of each of the plug and receptacle members. Each sealing diaphragm is provided with a plurality of normally closed slots disposed in line with the contacts mounted in the respective members. Upon mating of the connector members, the pin contacts pass through the slots in the respective diaphragms to engage the corresponding receptacle contacts. The diaphragm in the receptacle member is mounted on a spring loaded backing disc which will be driven inwardly of the receptacle member by the plug member to expose the pin contacts therein. Upon unmating of the connector members, the spring loaded disc returns the diaphragm to its original condition with contacts withdrawn from the slots, which assume a sealing condition. The connector also includes sealing means for making an environmental tight seal with both a cable or individual conductors terminated by the connector members.

It is therefore an object of the present invention to produce an improved electrical connector which will provide a tightly sealed enclosure about the contacts of both the plug and the receptacle members, in both mated and unmated conditions, which will protect the contacts against normal atmospheric conditions such as moisture and dirt.

It is a further object of the present invention to produce an improved environmentally sealed electrical connector which can be mated and unmated with a single hand.

It is still another object of the present invention to produce an electrical connector in which the receptacle member is provided with a sealing diaphragm mounted on a spring loaded disc, with the diaphragm having a plurality of slots therein disposed above the associated contacts and in a normal first position conceals the contacts and in the mating second condition is depressed to expose the contacts for mating with contacts of the plug member.

It is a further object of the present invention to produce an improved electrical connector which is particularly suitable for use in the transportation industry to provide sealed electrical interconnection between traction and trailer units.

It is yet another object of the present invention to produce an improved electrical connector which is sealed from the ambient conditions, including moisture and dirt, at all times and thus is particularly useful for providing electrical interconnection between tandem vehicles.

It is yet another object of the present invention to produce an improved connector which is sealed in the mated and unmated conditions and which can be readily and economically manufactured.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 2 is a partial longitudinal section through the subject connector in an unmated condition;

FIG. 3 is a view similar to FIG. 2 showing the subject connector in the fully mated condition;

FIG. 6 is a longitudinal section through a portion of the connector showing an alternate sealing member for individual conductors; and FIG. 7 is a longitudinal section through an alternate cable sealing member.

DETAILED DESCRIPTION OF THE PREFERRED EMBODIMENTS

Figure 1:
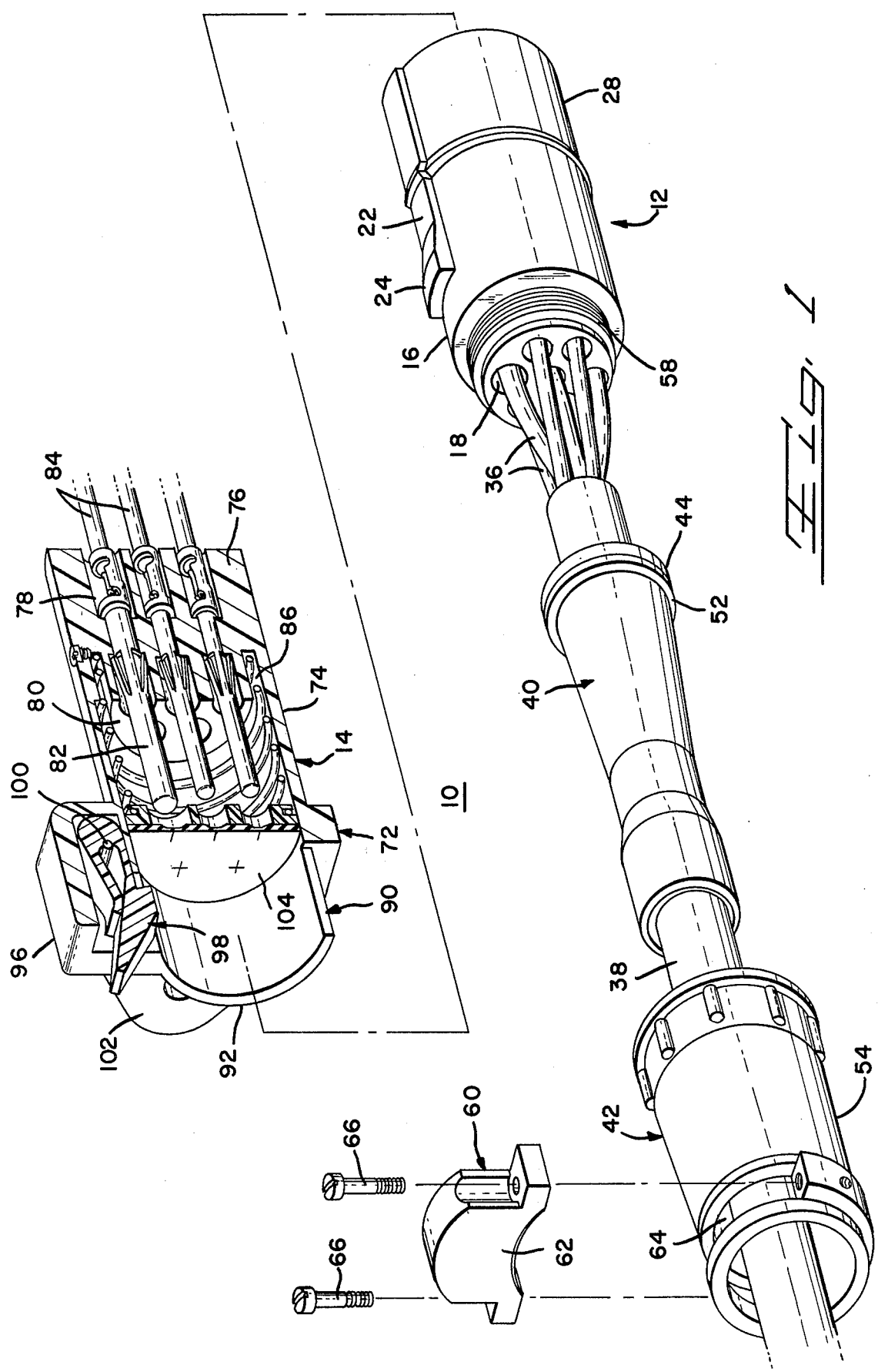
FIG. 1 is a partially exploded, partially sectioned, perspective view of the subject electrical connector.

The subject connector 10 includes a plug member 12 and a receptacle member 14. The plug member 12 includes a plug housing 16 having a plurality of contact receiving bores 18 leading to a mating face 20, an outwardly directed, longitudinally extending keying projection 22 terminating at a locking detent 24, and a peripheral groove 26 spaced from the mating face 20. A sealing diaphragm 28 is mounted on the mating end of the plug housing by a flange 30 which engages in groove 26. A plurality of slots 32 are formed in the diaphragm face, each disposed above one of the respective bores 18. A receptacle contact 34 is positioned in each of the bores 18 with the contacts being crimped connected to a like plurality of conductors 36 of a cable 38. The cable 38 passes through a cable seal 40 and a strain relief assembly 42. The cable seal 40 is a profiled tubular member having an outwardly directed flange 44 at one end and an inwardly directed cable sealing means 46 at the opposite end. The cable sealing means 46 is an integral combination of a truncated conical member 48 and cylindrical member 50 the walls of which extend substantially parallel to the jacketing of the cable 38 and define an aperture of lesser internal dimensions than the exterior dimensions of the cable. A washer or stiffening ring 52 is mounted on the seal 40 adjacent flange 44 to assure a tight engagement of the seal with the plug housing 16. The strain relief assembly 42 includes a tubular member 54 having internal threads 56 on one end adapted to engage with external threads 58 on the plug housing 16 and with clamp means 60 at the opposite end for fixedly engaging the cable 38. The clamp means 60 includes a profiled clamping member 62 which is received in a slot 64 in the tubular member 54 and secured therein by threaded members 66.

Figure 4:
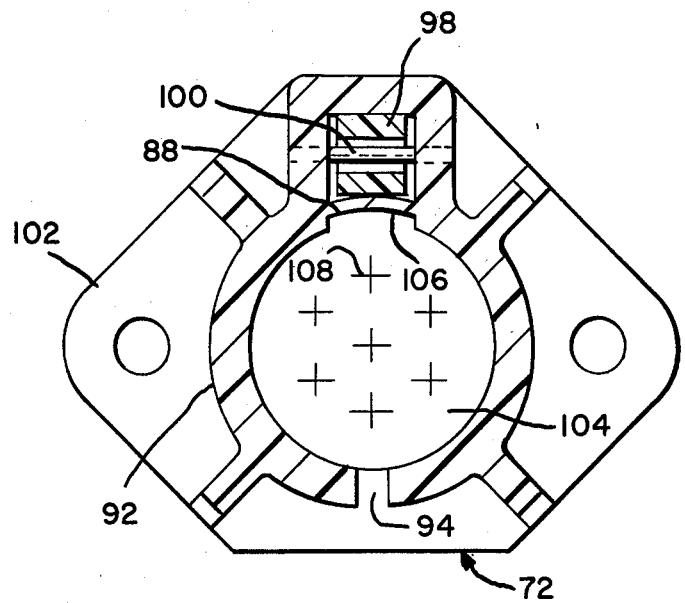
FIG. 4 is a transverse section taken along line 4—4 of FIG. 3.
Figure 5:
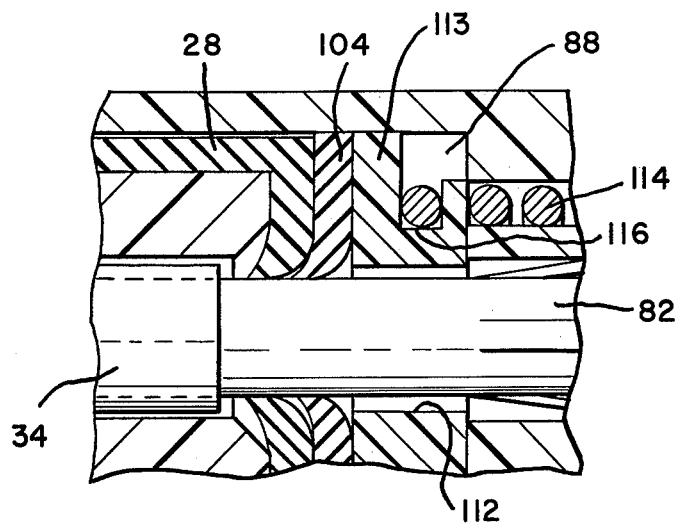
FIG. 5 is an enlarged detailed view of the sealing diaphragms in sealing engagement with the respective contacts, as shown in FIG. 3.

The receptacle member 14 is shown in an embodiment adapted to be mounted on a bulkhead 68 or the like through the intermediary of a gasket 70. The receptacle member 14 includes a unitary receptacle housing 72 having a tubular central portion 74 closed at one end by a contact receiving portion 76 with a plurality of contact receiving bores 78 therein opening onto mating face 80. A male contact 82 is inserted in each of the respective bores 78 and is connected to a respective conductor 84. An annular recess 86 forms an extension of the tubular central portion 74 about the contact receiving portion 76. The tubular central portion 74 also includes a longitudinally extending keying recess 88, which can best be seen in FIG. 4. At the forward end of the tubular portion 74 there is a hood extension 90 formed by a pair of arcuate members 92 which are slightly spaced at their lower ends, to form a slot 94 therebetween, and are connected at their upper ends to form a latch receiving housing 96. A latch member 98 is positioned in the housing 96 and secured by a fixed pin 100. An integral flange 102 extends radially outwardly from the periphery of the receptacle housing 72 and is used to mount the receptacle member in the bulkhead or panel 68. A sealing diaphragm 104 is fitted within the tubular portion 74 with a keying projection 106 aligned with a keying recess 88 in the housing. The sealing diaphragm 104 has a plurality of normally closed slots 108 formed therein and is supported by a rigid backing member 110 having a like plurality of apertures 112 in alignment with slots 108 and the respective contacts 82. The backing member also has a keying projection 113. A helical compression spring 114 has one end engaged in a peripheral groove 116 in backing member 108 and is held in the housing by means of a set screw 118 which is sealed in the connector housing by a gasket 120.

The subject connector is assembled in a conventional fashion. Either the contacts 34 are first secured to the respective conductors 36 and then fed through the cable seal or vice versa. The cylindrical portion 50 makes sealing engagement with the cable 38 as shown or even when reversed upon itself, as might happen if the cable is inserted too far into the seal and then withdrawn. The contacts 34 are then inserted into their respective bores 18 in the plug housing. The seal 40 is engaged with the rear end of the plug housing 12 and the strain relief assembly 42 is threaded onto the plug housing 12. During this threading action, the washer 52 prevents twisting of the seal 40 while providing a rigid support for flange 44 of the seal 40. The strain relief is applied to the cable by driving member 62 into the slot 64 and securing it therein by means of the threaded members 66. The diaphragm 28 is mounted over the free end of the plug housing with the flange 26 engaging in recess 30.

The receptacle member 14 is assembled in a somewhat similar fashion with the contacts 82 being first engaged with conductors 94 and then inserted into the respective bores 78. The diaphragm 104 of the receptacle member is mounted on the support member 110 with the keying projections 106 and 113 in alignment. One end of the spring 114 is engaged in the annular groove 116. The sealing assembly of the diaphragm, backing member and spring is then inserted, spring first, into the receptacle portion with the spring being received in recess 86 and secured therein by engagement of the screw 118 with the end of the spring. Thus the sealing assembly is positioned so that it will not fall out of the receptacle member nor extend too far out of the tubular portion 74 so as to prevent proper sealing of the receptacle member in the unmated condition. The latching means 98 is inserted into the housing 96 and secured therein by insertion of the pin 100.

The pin 100 preferably is a shear pin which will break when a predetermined load is applied to the cable. When the pin breaks, this will allow the connector members to become uncoupled without damaging either the connector or the cable terminations.

The two members of the connector are thus assembled in a sealed unmated condition, as shown in FIG. 2. Either of the connector members can be exposed to the normal atmospheric elements of wind, rain and dust without the contacts themselves being exposed. Thus there is a potential for great life expectancy for the contacts since they would not be likely to be exposed to an atmosphere or environment which would be condusive to corrosion or to the introduction of material which would prevent making a good electrical contact between contacts 34 and 82. The slot 94 also allows for drainage and prevents buildup of debris at the opening of the receptacle member.

The connector members are engaged simply by inserting the plug 12 into the receptacle 14. The plug has a keyed profile which matches with the profile of the receptacle to assure polarized operation. When the mating face of the plug member engages the diaphragm 104, the sealing assembly is pushed backwards against the resistance of the spring 114. As the sealing assembly is depressed, the contacts 82 are exposed through the respective slots 108 in diaphragm 104 and continue through the slots 32 of the diaphragm 28 to engage in the receptacle contacts 34. The force of spring 114 is not sufficient to prevent the insertion of the plug member into the receptacle member, but is sufficient to assure the sealing assembly will take position shown in FIG. 2 under a no-load condition. The plug member is fully inserted into the receptacle member when the latching member 98 engages the detent 24.

From the foregoing it is quite apparent that the subject plug member can be inserted into the receptacle member using one hand only since there is no need to remove a conventional spring loaded cover prior to making the mating engagement. Likewise the plug member can be unmated from the receptacle member simply by raising the latch 98 and pulling the plug member from the receptacle member. This also can be accomplished using just one hand.

As the plug member is removed from the receptacle member, the contacts 82 are withdrawn from engagement with the contacts 34 and eventually are withdrawn from the slots 32 as the plug member is completely removed. The slots 32 close to seal the contacts 34 within the plug member 12. Simultaneously with this movement, the seal assembly 104 is driven forwardly by the spring 114 until the contacts 82 are withdrawn through the slots 108 which again assume a closed and sealed condition.

An alternate embodiment for sealing a cable or individual conductors to the connector are shown in FIG. 6. In the alternate embodiment the sealing means 122 is intended for use with individual conductors 124. The sealing means 122 is provided with a plurality of bores 126 each having an integral seal formed by a truncated conical portion 128 and continuous cylindrical portion 130 extending substantially parallel to and inwardly of the walls of the bore 126. The portion 130 has an inner dimension less than the outer dimensions of the conductor 124 to form a sealing engagement therebetween. The sealing means 122 has an outer profile while is adapted to mate with washer 52, the strain relief assembly 42 and the housing 16.

The alternate sealing means 132 of FIG. 7 is intended for use with cables and includes a rear portion 134 which is substantially identical to that of seal 40. This portion includes a truncated conical flange 136 and integral cylindrical seal 138 which sealingly engage cable 140. The forward tubular portion 142 of the sealing means is intended for performing a latching operation with a housing member 144 to obviate the need for separate strain relief member. The forward tubular portion 142 includes an inwardly directed annular lip 146 adapted to engage over a step 148 in housing 144. A number of latching projections 150 are integral with the free end of the tubular portion 142 and extend radially inwardly to engage with a like number of detents 152 on the outside profile of the receptacle member 154.

The present invention may be subject to many changes and modifications without departing from the spirit or essential characteristics thereof. The present embodiments are therefore to be considered in all respects as illustrative and not restrictive of the scope of the invention.

What is claimed is:

1. An electrical connector which is sealed in a weather tight condition in both the mated and unmated conditions, said connector comprising:

a plug member including a housing having a mating face on one end, a plurality of contact receiving bores passing through said housing and opening onto said mating face, a like plurality of contacts each connected to a respective one of a plurality of conductors of a cable and received in a respective one of said bores with said contact directed towards said mating face, first sealing means covering said mating face of said connector, said first sealing means having a like plurality of normally closed slots each positioned in alignment with a respective one of said bores and said contacts, and second sealing means at the other end of said member effecting a fluid tight seal between said cable and said plug member;

a receptacle member including a plug member receiving recess closed at one end by a contact receiving block with a mating face directed inwardly of said recess, a plurality of contact receiving bores in said block leading to said mating face, a sealing assembly mounted for reciprocal movement in said recess, said sealing assembly including a sealing diaphragm having an outer periphery in wiping engagement with the inner periphery of said plug member receiving recess and a plurality of normally closed slots therein each disposed above a respective one of said contact bores, a rigid support plate having apertures therein aligned with said slots, a spring member attached to said plate and said receptacle housing allowing limited reciprocal movement of said sealing assembly within said recess and a hood extending from said receptacle housing substantially enclosing said plug receiving recess, a slot in said hood extending the length of a bottom portion thereof whereby a buildup of moisture and particles in said hood is prevented; and latching means adapted to secure said plug member and said receptacle member together in a mated condition and including a detent on one of said members and a latching lever operatively mounted on the other of said members to resiliently engage said detent.

2. A sealed electrical connector according to claim 1 wherein said latching means comprises:
a fixed detent on said plug member, and
a latching lever operatively mounted on said receptacle member to resiliently engage said detent.

3. A sealed electrical connector according to claim 1 further comprising:
an outwardly directed mounting flange integral with said receptacle member whereby said member can be mounted on a bulkhead.

4. A sealed electrical connector according to claim 1 wherein said second sealing means effects a fluid tight seal between each of a plurality of conductors attached to the respective contacts and said plug member, said second sealing means having an outer profile matching that of said plug member housing and a plurality of profiled conductor sealing apertures each defined by an integral truncated conical portion and a cylindrical portion, the inner dimension of said cylindrical portion being less than the outer dimension of the conductor received therein.

5. A sealed electrical connector according to claim 1 wherein said contacts in said plug member are receptacle contacts and said contacts in said receptacle member are pin contacts which extend through the respective slots in said sealing means and said sealing assembly to mate with the corresponding receptacle contacts.

6. A sealed electrical connector according to claim 1 wherein said first sealing means on said plug member further comprises an integral outwardly directed flange effecting sealing engagement between said plug and said receptacle members in the mated condition.

7. A sealed electrical connector according to claim 1 wherein said second sealing means comprises cable sealing means effecting a fluid tight seal between the conductor cable and said plug member, said cable sealing means comprising a substantially tubular unit having a radially outwardly flared flange at one end mating with the profile of said plug member,
a profiled cable engaging seal on the other end including an integral assembly of a truncated conical portion and a cylindrical portion having an internal diameter of lesser dimensions than the external diameter of said cable whereby sealing engagement therebetween is effected, and
means to tightly secure said flange against said plug member.

8. A sealed electrical connector according to claim 7 further comprising:
an annular member engaging said flange, and
said means to tightly secure said flange comprises an annular threaded member having an inwardly directed flange engaging said annular member and with the threaded portion engaging said connector member.

9. A sealed electrical connector according to claim 1 further comprising a strain relief assembly,
said assembly including a rigid tubular member having means on a first end to detachably engage said connector member and cable clamping means on the other end to grip at least one conductor therein.

10. A sealed electrical connector according to claim 9 wherein said at least one conductor comprises an electrical cable.

11. A sealed plug member for an electrical connector, said plug member comprising:
a housing having a mating face on one end and at least one contact receiving bore leading to said face and, a groove about the periphery of said housing spaced from said mating face,
a like number of contacts each connected to a respective conductor and received in a respective one of said bores directed toward said mating face,
first sealing means enclosing said mating face, said first sealing means including a diaphragm portion extending across said mating face and an integral flange portion having an inwardly directed lip engaging in said groove, said first sealing means having a normally closed slot disposed over each said bore, said normally closed slot being in said diaphragm portion, and
second sealing means at the other end of said housing effecting a fluid tight seal between said conductors and said housing.

12. A sealed plug member according to claim 11 further comprising:
a radially outwardly directed flange integral with said first sealing member for effecting a wiping and sealing engagement with a respective receptacle member.

13. A sealed plug member according to claim 11 further comprising:
means to secure said plug member in a respective receptacle member.

14. A sealed plug member according to claim 11 further comprising:
a conductor strain relief assembly including a rigid member having means on one end to detachably engage said housing and means on the other to fixedly engage at least one conductor.

15. A sealed plug member according to claim 11 wherein said housing has a profiled cross section for keyed mating of said plug in a respective receptacle member.

16. A sealed plug member according to claim 11 wherein said contacts are receptacle contacts.

17. A sealed plug member according to claim 11 further comprising:
a second sealing member having integral first flange means engaging with said housing, and
integral second flange means defining at least one restricted opening having an inner diameter less than the outer diameter of a conductor received therein to effect a seal therebetween.

18. A sealed plug member according to claim 17 wherein said second sealing member is substantially planar and a plurality of second flange means are formed therein.

19. A sealed plug member according to claim 17 wherein said second sealing member is substantially tubular with said first flange means on one end and said second flange means on the other end.

20. A sealed plug member according to claim 17 further comprising:
means to secure said second sealing member to said housing comprising an annular member having means to detachably engage said housing and to bias said sealing member against said housing.

21. A sealed receptacle member for an electrical connector, said member comprising:
a housing defining a plug receiving recess and hood means projecting from said housing and surrounding said recess, and a slot in said hood means extending the length of a bottom portion thereof whereby buildup of moisture and debris in said hood means is prevented,
a contact block closing one end of said recess with a mating face directed into said recess, a plurality of contact receiving bores in said block opening onto said mating face, and a like plurality of contacts each connected to a respective conductor of a cable and mounted in a respective one of said bores with said contact directed toward said mating face,
a sealing assembly comprising a diaphragm having an outer periphery in wiping engagement with inner periphery of said plug receiving recess, said diaphragm having a plurality of normally closed slots disposed in alignment with each said contact receiving bore, a rigid plate having a plurality of apertures in alignment with said slots and supporting said diaphragm substantially across the entire surface thereof, and spring means resiliently securing said assembly for reciprocal movement within said recess, and
latching means adapted to secure a plug member therein in a mated condition.

22. A sealed receptacle member according to claim 2 further comprising:
flange means integral with said housing to mount said member on a panel.

23. A sealed receptacle member according to claim 2 wherein said recess has a profiled cross section to provide polarized mating of a corresponding plug member 24. A second receptacle member according to claim 21 wherein:
said latching means comprises a resiliently mounted lever in said housing adapted to engage and secure a plug member received in said receptacle member.

25. A sealed receptacle member according to claim 21 further comprising:
means mounting said latching means in said housing, said mounting means having a predetermined shear strength whereby said latching means will release upon application of sufficient force to a plug member secured thereby before damage occurs to said connector.

26. A sealed receptacle member according to claim 21 further comprising:
a sealing member having integral first flange means engaging with said housing, and
integral second flange means defining at least one restricted opening having an inner diameter less than the outer diameter of a conductor received therein to effect a seal therebetween.

27. A sealed receptacle member according to claim 21 further comprising:
a conductor strain relief assembly including a rigid member having means on one end to detachably engage said housing and means on the other end to fixedly engage at least one conductor.

28. A sealed receptacle member according to claim 21 wherein said contacts comprise pin contacts capable of projecting through said slots upon depression of said sealing assembly whereby mating with corresponding contacts is effected.

* * * * *